United States Patent Office 3,470,800
Patented Oct. 7, 1969

3,470,800
PHOTOGRAPHIC CAMERA WITH FLASH CONTACT
Heinz Waaske, Runingen, Germany, assignor to Rollei-Werke Franke & Heidecke, Braunschweig, Germany, a German firm
Filed Aug. 28, 1967, Ser. No. 663,589
Claims priority, application Germany, Sept. 3, 1966, R 44,060
Int. Cl. G03b 9/70
U.S. Cl. 95—11.5                                                    6 Claims

ABSTRACT OF THE DISCLOSURE

A photographic camera having a master member or main driving member for opening and closing the shutter. This master member has a lug engaged by a releasable latch for holding the master member in tensioned or cocked position. This same lug on the master member engages a fork in a rotatable member, so that the rotatable member is rotated in one direction when the master member is being tensioned, and is rotated in the opposite direction when the master member runs down. The rotatable member, in turn, operates a pawl during the running down movement of the master member, to close an electric contact at the moment that the shutter blades are fully open.

CROSS REFERENCE TO RELATED APPLICATION

The present invention is an improvement on the construction disclosed in the copending patent application of Heinz Waaske, Serial No. 553,077, filed May 26, 1966, the disclosure of which is incorporated herein by reference. Familiarity with the disclosure of the prior related application will facilitate quick understanding of the present invention.

BACKGROUND OF THE INVENTION

In flashlight photography, as well understood, the flash should reach maximum or peak illumination at the time the shutter blades are fully open. If a flash bulb with a time lag is used, such as the familiar Type M bulb, the electric contact for igniting the bulb must be closed slightly before the shutter blades reach maximum opening, to allow for the time lag. On the other hand, if so-called Type X is used, where there is no delay between the time of closing the electric circuit and the time of maximum illumination, then the electrict contact should be closed just as the shutter blades reach maximum opening.

The present invention relates to a camera having an objective shutter, often called a between-the-lens shutter, in which shutter blades in the vicinity of the lens are driven through opening and closing movements by a rotatable blade ring. With an objective shutter of the usual type, the obvious way to achieve the closing of a Type X contact is to have it closed by the blade ring when the blades reach maximum opening. However, this is not always feasible. For example, in the camera for which the present invention is especially but not exclusively intended, the lens and the shutter blades are mounted in a lens tube which is movable axially from a retracted position mainly within the camera body, for the sake of compactness, to an extended position mainly outside the camera body, which is the position for picture taking. The shutter driving mechanism for driving the blade ring and shutter blades, however, is not mounted on the lens tube, but is mounted in a stationary position within the camera body itself, to one side of the lens tube, and is operatively connected in driving relation to the blade ring through connections only partially indicated in the present application and in said related application, the details thereof being unimportant for purposes of the present invention.

Because of the limited space within the lens tube, as well as because of the axial movability of the tube, it is not practical to have the Type X electrical contact operated by the blade ring within the tube. Therefore, another practical way must be found for operating the electric contact, and the present invention offers a convenient solution to this problem, and also a solution which requires very little space and thus contributes to the compact nature of the camera for which the invention is especially intended.

BRIEF DESCRIPTION OF THE DRAWINGS

In the accompanying drawings, which form a material part of the present disclosure and which relate to an illustrative embodiment of the invention.

DESCRIPTION OF THE PREFERRED EMBODIMENT

Figure 1:
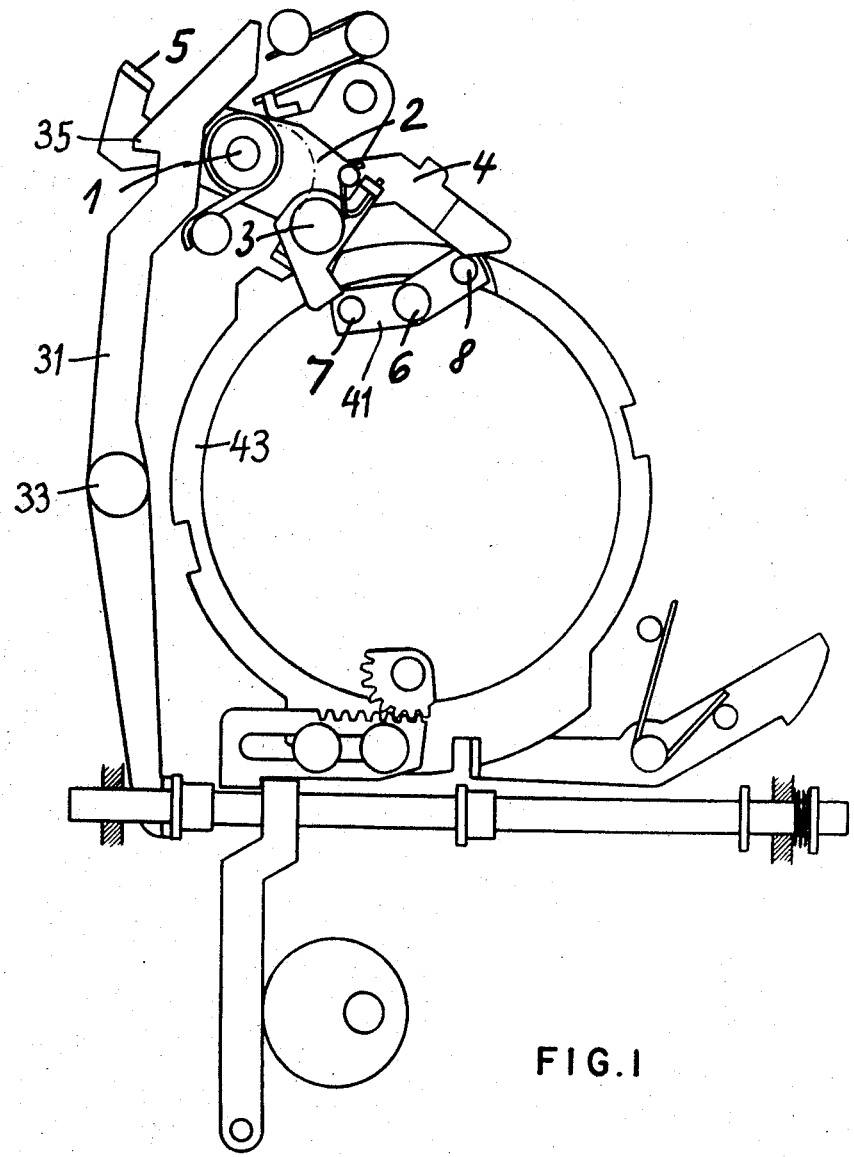
FIG. 1 is a schematic elevational view of the master member of the shutter and related parts, and the end of the lens tube.

Referring now to FIG. 1, the main driving member of the shutter, usually called the master member, is indicated in general at 2, and turns around the stationary pivot 1, in a clockwise direction when it is running down from its tensioned or cocked position, and in a counterclockwise direction when it is being tensioned or cocked ready for the next exposure. It is held in tensioned position by means of a latching level 31 pivoted at 33 and having a nose 35 which engages over an ear 5 on the master member when the latter is in the tensioned position. When the latch is released, the master member starts to run down in a clockwise direction under the influence of its main driving spring or master spring, so that a first arm 3 and a second arm 4 on the master member make contact respectively with pins 7 and 8 on an arm 41 mounted near its mid-point on a shaft 6 which extends longitudinally through the lens tube 43 near one wall thereof, from the rear end of the tube (which is seen in FIG. 1) forwardly to the vicinity of the lens and the shutter blades which are located near the lens, where the oscillation of the shaft 6 serves to rotate the conventional blade ring first in one direction and then in the opposite direction, in order to open and then to close the conventional shutter blades connected to the blade ring in the usual manner.

Figure 2:
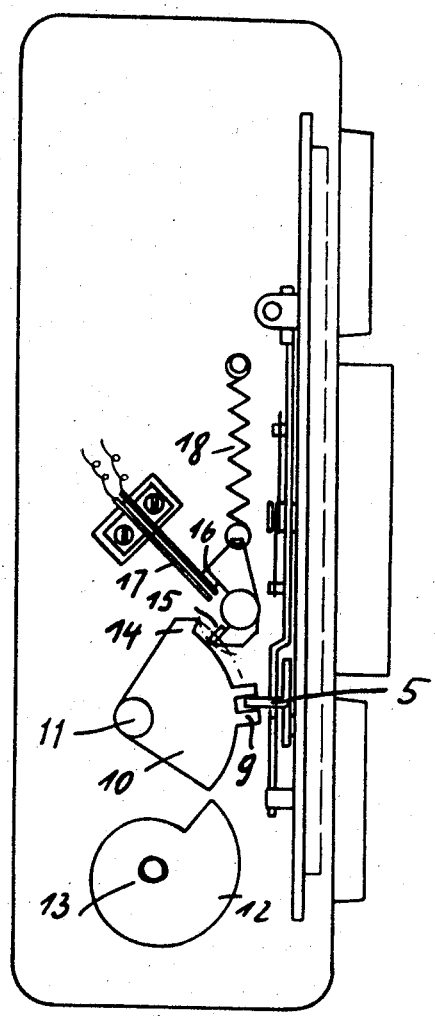
FIG. 2 is a schematic view of part of the interior of the camera body, illustrating the electric contact parts in plan, the plane of FIG. 2 being at a right angle to the plane of FIG. 1.

The position of the parts shown in FIG. 1 is an intermediate position during the running-down movement, representing the position when the shutter blades are fully open, and this position corresponds substantially to the position shown in FIG. 2 of said related application 553,077. In the starting position or tensioned position, the master member is somewhat counterclockwise of the position shown in FIG. 1, being in the position shown in FIG. 1 of said related application, and the ear or lug 5 of the master member is held by the portion 35 of the latch 31. Likewise the arm 41 on the shaft 6 is in a position somewhat clockwise of the position shown in FIG. 1 of the present application, in the initial starting position. Then when the latch 31 is released and the master member begins its clockwise running down motion, the first arm 3 on the master members hits the pin 7 on the member 41 and turns the member 41 (and the shaft 6, of course) counterclockwise from the initial position to the position shown in FIG. 1, which is the position in which the shutter blades are fully open. Then the second arm 4 on the master member hits the pin 8 and turns the member 41 back in a clockwise direction to the initial starting position, closing the shutter blades. This completes the running down movement of the master member. Then when the master member is tensioned or cocked in a counterclockwise direction, the arm 4 slides past the pin 8 without difficulty, while the first arm 3 is able to pass the pin 7 because the arm 3 is in the form of a spring pressed pawl, which can turn on its pivot when it hits the pin 7 during the tensioning movement, and then can snap back into effective position when it passes the pin.

According to the present invention, advantage is taken of the lug 5 in order to operate the electric contact for setting off the flash. Referring now to FIG. 2, it is seen that a portion of this lug 5 engages in a forked part 9 on a segment 10 mounted for rotation on a stud 11. A cam 12 mounted on the tensioning or cocking shaft 13 engages the segment 10 to turn it in a counterclockwise direction when the tensioning cam is turned clockwise. The parts are so arranged that the movement of the lug or ear 5 on the master member, during the tensioning motion, is in an upward direction when viewed as in FIG. 2, and during the running down motion it is in a downward direction when viewed as in FIG. 2.

During the running down motion, just as the master member reaches the position where the shutter blades have become fully open, a projection 14 on the segment 10 engages an ear 15 on a pivoted pawl and swings this pawl counterclockwise on its pivot, so that another ear 16 on the same pawl forces the electric contact members 17 together to close the electric circuit to the flash apparatus. The other features of such electric circuit are conventional and well known, so are not illustrated. The contact members 17 are spring contacts which are normally parallel to each other and slightly spaced from each other, but when the pawl is turned, the ear 16 flexes one of the contact members 17 to force it against the other, thus closing the circuit. A light spring 18 normally holds the pawl in the position illustrated in FIG. 2, with the ear 16 of the pawl just in contact with one of the switch contact members 17 but not deflecting such member. The spring 18 allows the pawl to swing counterclockwise from the illustrated position, when the part 14 of the segment 10 reaches the pawl, and the pawl swings far enough to allow the part 14 to pass the pawl in order to complete the running down movement of the master member, whereupon the pawl resumes the position illustrated in FIG. 2. When the master member is tensioned, by operation of the cam 13 moving the segment 10 in a counterclockwise direction and thereby, through the fork 9, moving the lug 5 of the master member the part 14 of the segment 10 deflects the pawl in a clockwise direction as allowed by the spring 18, without closing the flash contact during the tensioning cycle.

This arrangement is particularly satisfactory in the case of short exposure times with correspondingly high speed of travel for the shutter blade drive ring. With short exposures, the time available for the closing of the electric contact is extremely short, but the present arrangement enables satisfactory closing of the contact in an accurate manner, without the phenomenon of chatter or bounce which occurs in some other forms of flash contact apparatus.

What is claimed is:

1. A photographic camera having a rotatable master member rotatable in one direction to drive shutter blades through opening and closing movements and rotatable in an opposite direction to tension the master member ready for an exposure operation, said master member having a lug thereon, a releasable latch engaging said lug to hold said master member in tensioned position, a rotatable member coupled to said lug to be driven by said lug during running down movement of said master member, a flash circuit contact switch normally open, and means operated by said rotatable member for closing said switch during running down movement of said master member.

2. A construction as defined in claim 1, in which the connection between said rotatable member and said lug comprises a forked portion on said rotatable member embracing said lug.

3. A construction as defined in claim 2, wherein said rotatable member has a plane of rotation approximately at a right angle to a plane of rotation of said master member.

4. A construction as defined in claim 1, further comprising means acting on said rotatable member to turn said rotatable member in a direction opposite to the direction in which it is turned by said lug during a running down movement of said master member, thereby to cause said rotatable member to tension said master member.

5. A construction as defined in claim 1, wherein said means for closing said switch includes a pivoted pawl engaged by a projection on said rotatable member and swung in one direction during running down movement of said master member and swung in an opposite direction during tensioning movement of said master member.

6. A construction as defined in claim 5, further including a light spring tending to hold said pawl in an intermediate position.

References Cited

UNITED STATES PATENTS

| | | | |
|---|---|---|---|
| 2,469,688 | 5/1949 | Fuerst | 95—11.5 |
| 2,480,604 | 8/1949 | Pirwitz | 95—11.5 |
| 3,111,073 | 11/1963 | Mueller | 95—11.5 |

FOREIGN PATENTS

41/2034  2/1966  Japan.

NORTON ANSHER, Primary Examiner

F. L. BRAUN, Assistant Examiner

U.S. Cl. X.R.

95—53